Patented May 24, 1938

2,118,310

UNITED STATES PATENT OFFICE 2,118,310

ART OF TREATING OIL-DECOLORIZING CLAYS

Harold L. Kauffman, Warren, Pa.

No Drawing. Application October 23, 1934, Serial No. 749,617

7 Claims. (Cl. 252—2)

This invention relates to improvements in the art of treating oil-decolorizing clays and products thereof. More specifically, it relates to improvements in methods or processes of heat-treating oil-decolorizing clays (for example, fullers' earths, neutralizing clays, and the like) and to the products thereof. One phase of this invention relates to improvements in methods of drying oil-decolorizing clays.

This application is a continuation in part of my co-pending application Serial No. 736,555, "Product for treating vapors, etc.," filed July 23, 1934.

This invention has as one of its objects a new and improved process for heat-treating oil-decolorizing-clay substances whereby there may be obtained, from a given starting oil-decolorizing-clay substance, an oil-decolorizing-clay end-product of improved properties and characteristics, for example, an oil-decolorizing-clay end-product of substantially increased porosity (and therefore of lower packed weight per cubic foot) than that possessed by the starting substance and of appreciably greater porosity than that obtained by the methods of heat-treating oil-decolorizing-clay substances heretofore known to the art.

Another object of this invention is a new and improved process for heat-treating an oil-decolorizing-clay substance of the type which, even when merely air-dried, shows a foliated or laminated structure (for example, Florida earth of the kind found near Quincy, Florida, and Attapulgus, Georgia), whereby there may be obtained, from a given starting oil-decolorizing-clay substance of this particular and peculiar type, an oil-decolorizing-clay end-product of improved properties and characteristics, for example, an oil-decolorizing-clay end-product which, in addition to having an increased porosity (that is to say, a greater porosity) than that possessed by the starting substance and an appreciably greater porosity than that obtained by the methods of heat-treating such oil-decolorizing-clay substances heretofore known to the art, also has been otherwise changed, for example, the individual particles of the oil-decolorizing-clay end-product have a flatter shape than heretofore has been possible by the practicing of any of the heat-treating methods that are old in the art.

Another object of this invention is a more rapid method of heat-treating oil-decolorizing-clay substances than heretofore has been known to the art, and the obtainment, by utilizing the method of heat-treating that hereinafter will be described, of oil-decolorizing-clay end-products of high quality. Rapid heating of the starting substance, further, results in increased plant capacity for a given capital investment in equipment, the advantages of which are commonly recognized in industry. Still other objects of the invention will be apparent to those skilled in the art from a reading of this specification.

The starting material employed in the practicing of my invention is an oil-decolorizing-clay substance, specific examples of which will be given immediately hereinafter. By "oil-decolorizing clay" I mean any clay, clay-like mineral or clay-like rock of porous or cellular structure and of high adsorptive capacity and which, either in its raw or natural state or after chemical or other treatment and/or after drying partially, grinding and screening or otherwise separating into particles of the desired size, has such high capacity to decolorize and otherwise purify and improve vegetable and animal oils, fats and waxes (e. g., mineral waxes) and petroleum hydrocarbon oils that they find, in that state and form, wide use for such purposes in industry.

"Fuller's earth" is one specific type of oil-decolorizing clay, and is thus defined by Paul Hatmaker and Jefferson Middleton in Bureau of Mines' publication, "Fuller's Earth in 1931" (Mineral Resources of the United States, 1931, Part II, published October 5, 1932), namely, as "a natural clay-like mineral substance having a high capacity for decolorizing oils and fats. The term is somewhat loosely applied to such material possessing certain definite bleaching properties in its natural state. 'Fuller's earth' is a commercial name rather than a mineralogical designation, so called from the early use of such earth to remove grease from wool. Chemically, fuller's earth consists of complex hydrous aluminum silicates with varying amounts of iron oxide, magnesia, lime and alkalies; usually, its chemical composition has little to do with classification, which is based upon its efficiency in use. Fuller's earth is differentiated from other somewhat similar clays and earths only because of its superior affinity for oils and grease and for basic coloring matter." A bentonite of sufficiently high bleaching value in its raw state is, oftentimes, in commercial usage called "fuller's earth." Therefore, the term "fuller's earth," as herein used, is intended to be understood as including and covering such a bentonite.

Most of the fuller's earth that is mined at present in the United States is obtained from the States of Florida and Georgia. In these States the earth is found, for example, in Decatur, Twiggs, Baldwin, Houston, Jefferson, Randolph, Screven, Washington, and Wilkinson counties, Georgia; and in Gadsden, Marion, Manatee, and Hernando counties, Florida. Such fullers' earths all have highly porous or cellular structures; weight (depending upon the particular deposit and section thereof), after drying and reducing to size, from about 28 to about 42 pounds per cubic foot; are, for the most part, quite similar otherwise in their general physical properties and characteristics; are all suitable for use as a starting material in practicing my invention; and in the claims which follow hereinafter are designated generally as Florida fuller's earth.

"Neutralizing clay" is another type of oil-decolorizing clay. Classed as such are certain natural clay-like mineral substances which are deficient, although not completely lacking, in their power to decolorize oils, but which have marked affinity for the free mineral acid present in oils that have been treated with sulfuric acid by the petroleum refiner as a step in the process of manufacture, and incidentally decolorize such oils to a limited degree while neutralizing them. Clays of this type are mined in large quantities in Texas.

"Activated bleaching clay" is still another type of oil-decolorizing clay. Certain clay-like minerals, such as montmorillonite and the like, having in their natural state little if any power to bleach oils, that is to say, such a limited decolorizing power in their natural state that they are not suited for use in the commercial decolorization of oils, may be rendered highly active by a chemical treatment (e. g., an acid treatment), which varies in detail with the different starting materials. The product of such a process of treatment is a highly efficient bleaching agent for oils and is commonly called an "activated bleaching clay."

Heretofore, in the heat treatment of an oil-decolorizing-clay substance such as fuller's earth in order to dry it (that is to say, in order to reduce the free moisture content of the earth to the point where the earth would be acceptable to the trade), it has been the practice to charge the fuller's earth to the dryer at such a rate that the earth was heated at increasing temperatures relatively slowly, and the maximum temperature to which the earth was heated did not usually exceed about 650° F., or, in an occasional instance, about 700° F.; and most operators generally conducted their drying operations in such a manner that the maximum temperature to which the earth was heated did not exceed about 600° F., and often thereunder, for example, about 500°–550° F. Heretofore, depending upon the moisture content of the earth as charged to the dryer and upon the maximum temperature to which the earth was heated therein, each piece of fuller's earth was in the dryer for a relatively long period of time, for example, in some instances, for from about 10 to 20 minutes, but, more commonly, for from about 18 to 30 minutes. Such practices were not conducive to and did not effect the removal of the water with what may properly be regarded and described as an almost explosive effect; therefore, there were not obtained the resultant benefits and advantages in the condition or state of the adsorbent end-product, after such a method of heat-treating to dry the fuller's earth, which benefits and advantages are obtained by the practicing of my invention. These benefits and advantages in the condition or state of the end-product, that results from the practicing of my invention, will and do vary,—depending upon the particular and peculiar starting oil-decolorizing-clay substance employed and the particular time and temperature conditions utilized by me in quickly heat-treating the starting substance; among these resulting benefits and advantages in the condition or state of the fuller's earth after being heat-treated in accordance with my invention may be mentioned, for example, an increased porosity that affords an increased surface area, which, in the use of the fuller's earth, becomes an increased (that is, greater) adsorbing area than that possessed by the starting substance and of appreciably greater porosity than that possessed by the end-product of any method or process of heat-treating oil-decolorizing-clay substances heretofore known to the art; or, as another example, when the starting oil-decolorizing-clay substance is of the type which, even when merely air-dried, shows a foliated or laminated structure, the practicing of my invention results in the obtainment of an oil-decolorizing-clay end-product which, in addition to having had its physical and/or chemical properties and characteristics otherwise improved by the particular and new and novel method of heat treatment to which it has been subjected (for example, having an increased porosity, that is to say, a greater porosity than that possessed by the starting substance and an appreciably greater porosity than that obtained by the methods of heat-treating such oil-decolorizing-clay substances heretofore known to the art), also has been so changed or altered by the treatment that, as a result thereof, the individual particles of the oil-decolorizing-clay end-product have a flatter shape than heretofore has been possible by the practicing of any of the heat-treating methods that are old in the art. The advantages of this flatness in the shape of the fuller's-earth particles have been fully set forth in my co-pending application Serial No. 736,555, "Product for treating vapors, etc.," filed July 23, 1934.

My invention differs from the processes heretofore known to the art in that I quickly heat-treat the oil-decolorizing-clay substance to obtain what may be properly regarded and described as an almost explosive effect, and for the purposes hereinbefore set forth. The quick heat-treatment of the oil-decolorizing-clay substance may be conducted at one or more stages of the process of preparing the oil-decolorizing-clay substance for market, as hereinafter will be fully described.

One method of practicing my invention is as follows, it being emphasized that this is merely an illustrative example of a method of putting my invention into practice, and that various modifications of the hereinafter-described process may be made without departing from the spirit and scope of the invention:

Crude oil-decolorizing-clay substance such as fuller's earth, for example, Florida fuller's earth with physical properties similar to or like the fuller's earth found and mined near Quincy, Florida, and Attapulgus, Georgia, as well as in sections near thereto, is mined and is then transported to a drying shed where it is allowed to air-dry until a part of the free moisture has evaporated therefrom. The partly dried crude earth is then conveyed by an elevator to a primary furnace, kiln or other apparatus provided with means for the obtainment of temperatures therein of about 1600° F. and thereabove. Enroute to this furnace or kiln the earth is passed over a grate scalper whereby the smaller and more completely dried pieces or particles are removed from the main body of the material and are then separately dried to the free moisture content desired in the end-product. In the primary furnace or kiln the crude earth is reduced in free moisture content from an average free moisture content of, for example, from about 40 to about 45%, to an average free moisture content of, further as an example, from about 20 to about 25%. The earth is subjected in this furnace or kiln to a furnace temperature of at least about 1600° F., which temperature, as is well known, is substantially above the temperature at which fuller's earth shows incipient sintering or fusion if subjected to such temperature for a prolonged period of time. Depending upon the moisture content of the earth as charged to the furnace or kiln and the temperature at which the earth is heated therein, the earth is charged to the furnace or kiln and discharged therefrom at such a rate that each piece of fuller's earth is in the furnace or kiln for about less than 1 minute, for example, for as short a period of time as from about 4 to 5 seconds. The higher the temperature to which the fuller's earth is heated, the shorter is the period of time of heating; likewise, the higher the temperature and the shorter the period of time employed, the greater is the tendency for the steam (generated within the individual pieces of moisture-containing fuller's earth as a result of the heat to which the substance has been subjected) to liberate itself from the individual particle with an almost explosive effect, and thereby forcing an almost explosive expansion of the pieces of fuller's earth into smaller pieces of greater porosity than that possessed by the starting substance. The removal of the moisture with an almost explosive effect brings the starting material to its maximum porosity practically immediately; and results in the product of such treatment having the characteristic property that its cellular structure is distorted from normal by reason of the escape of moisture contained in the starting material with an almost explosive effect. The time and temperature of heating are so controlled in all instances as to obtain maximum rapidity in the removal of moisture, but under no conditions are the time and temperature of heating, during this initial heat-treating or operating step, such that incipient fusion of the fuller's earth takes place, since, when fusion begins within the individual piece of fuller's earth, there is, among other happenings, a decrease in the porosity and in the adsorbing power or capacity of that piece of fuller's earth.

By drying the crude Florida fuller's earth in this manner, the useful qualities and characteristics (for example, porosity, shape, adsorptive power or capacity, et cetera) are improved. After leaving the primary furnace or kiln, the earth is passed through a scalping unit whereby the smaller and drier pieces or particles are removed from the main body of the material and are then separately dried to the free moisture content desired in the end-product, while the coarser particles are crushed to smaller size prior to further drying.

In all instances the earth is reduced in free moisture content by this primary drying to such a point that, when initially crushed in a primary crushing unit, the particular and peculiar physical characteristics that I desire to secure in my end-product will not be detrimentally affected by said primary crushing operation, and to such a point that the crusher will function at a suitable operating capacity. These smaller pieces are then separately dried to the free moisture content desired in the end-product by heating in a suitable manner, for example, by heating in the manner and for the period of time immediately hereinbefore described when describing the method of partly drying the fuller's earth of high moisture content in the primary furnace or kiln. The coarser, partly dried particles separated by the scalping unit mentioned in a preceding paragraph are then transferred to a primary crusher. Preferably this crusher is a swing-hammer type of crusher, such as the Williams Hinged Hammer Crusher or the Gruendler Swing Hammer Crusher. Crushing is conducted in such a manner, that is to say, at such a rate of speed and with the crushing mechanism so adjusted that there will be produced a maximum amount of fuller's-earth pieces of the desired size and shape. The pieces from the crusher, which pieces are, for example, from about ¾ inch to 1 inch in maximum diameter, and smaller, are then conveyed to another furnace, kiln or other apparatus provided with means for the obtainment of temperatures therein of about 1600° F. and thereabove, and wherein the pieces are dried to the free moisture content desired in the end-product, for example, to a free moisture content of between about 3 and 9%; or, as another example, the pieces may be heated to the point where all of the free moisture is removed and all, or a desirable portion, of the water of composition; or, as another example, in order to make an exceedingly hard and strongly water-resistant end-product, the pieces may be heated to the point which causes them to be substantially completely dehydrated (all of the free moisture and substantially all of the water of composition are removed) but below the point of substantial fusion of the individual pieces.

The earth is likewise heated in this second furnace, kiln or other apparatus substantially as set forth with regard to and when describing the time-temperature relationship when subjecting the oil-decolorizing clay to an initial or primary heat-treating operation for the purpose of, among other objects, partially drying it.

The fuller's-earth end-product which is substantially completely dehydrated and which may have been heated to such a temperature and for such a period of time as to result in incipient fusion—such a fuller's-earth end-product will be harder and more water-resistant (and therefore especially suitable for use in the treatment of water and aqueous liquids) than a fuller's-earth end-product from which all of the free moisture has been removed and all, or a desirable portion, of water of composition and which, let us say, is intended for use in the treatment of oils and which further, therefore, is not necessarily, if at all, hard and water-resisting and may not be of such characteristics as to be commercially suitable for the treatment of water and aqueous liquids. Nevertheless, these various forms of the end-products that are obtained by the practicing of my invention have the common characteristic of, among others, greater porosity, which results from quickly heat-treating the fuller's-earth substance, as hereinbefore described, with what may be properly regarded and described as an almost explosive effect.

Continuing with the description of an illustrative method of practicing my invention: By rapidly heat-treating the fuller's-earth in the second furnace or kiln as set forth, the earth is further improved in its physical and/or chemical characteristics in substantially the same manner and for substantially the same reasons as set forth immediately following a description of the method of initially heat-treating the fuller's earth.

After this second heat-treatment the fuller's-earth pieces are further reduced in size, if desired, by passing the pieces through a series of roll crushers, each crusher being so adjusted as to give pieces of smaller size than are obtained from the crusher immediately preceding it in the series. The product from each mill, that is, from each set of roll crushers, is fed to a sifting or bolting machine, such as the Great Western Sifter (manufactured by the Great Western Manufacturing Company, Leavenworth, Kansas). When it is desired to make fuller's-earth products finer than 16 mesh, each sifter is fitted with a bolting cloth so that there can be obtained therefrom products comprising ranges of particle sizes such as the following: 16/30 mesh, 30/60 mesh, 60/100 mesh, 100/up mesh (100 mesh and finer). The over-size obtained from any sifter in the series is charged to the next mill in the series, the over-size from sifter No. 4 (when four mills and sifters, for example, are being used in series) being returned to the first mill in the series. The over-size from the first sifter in the series, when making fuller's-earth products comprising particles of the ranges of sizes mentioned, is a fuller's-earth product comprising a range of particle sizes the smallest or most finely divided members of which are of such size that they will be retained on a U. S. Standard Sieve Series Number 16 sieve. Under certain conditions, for example, when the starting oil-decolorizing-clay substance is of the type which, even when merely air-dried, shows a foliated or laminated structure (for example, Florida fuller's earth of the kind found near Quincy, Florida, and Attapulgus, Georgia, as well as in sections near thereto), the individual granular particles (and by "granular" particles I mean particles or pieces of such size that they would be retained on a U. S. Standard Sieve Series Number 100 sieve, and coarser) comprising the end-product or -products are substantially less in average thickness than in average cross-sectional diameters; that is to say, in a granular fuller's-earth product comprising a particular range of particle sizes, for example 5/10 mesh, 10/16 mesh, 16/30 mesh, 30/60 mesh, 60/80 mesh and 80/100 mesh, substantially all of the individual particles comprising an end-product of a particular range of particle sizes are substantially less in average thickness than in average cross-sectional diameter. In the case of a product of 80/100 mesh particle size, substantially all of the individual particles comprising that end-product may be, for example, at least from about 10 to 20% less in average thickness than in average cross-sectional diameter; in the case of a product of 60/80 mesh particle size, substantially all of the individual particles comprising that end-product may be, for example, at least from about 20 to 30% less in average thickness than in average cross-sectional diameter; in the case of a product of 30/60 mesh particle size, substantially all of the individual particles comprising that end-product may be, for example, at least from about 30 to 40% less in average thickness than in average cross-sectional diameter; in the case of a product of 16/30 mesh particle size, substantially all of the individual particles comprising that end-product may be, for example, at least from about 40 to 50% less in average thickness than in average cross-sectional diameter; and in the case of an end-product or -products coarser than 16 mesh (for example, an end-product of 10/16 mesh particle size, or an end-product of 5/10 mesh particle size), substantially all of the individual particles comprising the said end-product may be and will be, for example, at least 50% (and upwards) less in average thickness than in average cross-sectional diameter. In all cases the coarser the mesh size, the greater is the difference between the average thickness and the average cross-sectional diameter of the individual particle; that is to say, the greater is the tendency of the individual particle towards thinness or flatness. In the case of particles coarser than 16 mesh, for example, coarser than 10 mesh, the average cross-sectional diameter of the individual particle may be and often is from two to five times (and more) that of the average thickness of the same particle.

Any of the fuller's earth end-products comprising a range of particle sizes may, if desired, be further bolted, sifted, screened or otherwise separated, treated or handled for the obtainment of fuller's-earth end-products of substantially uniform particle size.

As illustrative of one method of practicing my invention, I have hereinbefore described a process wherein the crude earth is rapidly heat-treated in two stages. An obvious modification of the hereinbefore-described process, and one which has obvious advantages over the process which has been described, is the rapid heat-treatment of the crude earth in a single stage within the temperature ranges and for the periods of time hereinbefore fully set forth and described when describing the two-stage heat-treating process. In a single-stage process, however, it will usually be necessary to increase somewhat the time and temperature of heating (within the time and temperature ranges hereinbefore fully set forth and described) in order to obtain end-products from each process of the same physical and/or chemical characteristics.

Another obvious modification of my invention is the drying of the crude earth, in order to reduce its free moisture content, in the manner old in the art, and then rapidly heat-treating the crude and/or crushed, partly dried fuller's earth in the same manner as hereinbefore has been fully set forth and described. The pieces of crude fuller's earth that thus have been quickly heat-treated are then milled for the obtainment of end-products of desired particle size in accordance with practices old in the art.

Still another modification of my invention consists in preparing comminuted grades (both granular and powdered grades) of fuller's earth in accordance with practices old in the art, and then quickly heat-treating the granular or powdered (whichever it may be) fuller's earth in the same manner as hereinbefore has been fully described and for one or another of the objects that likewise hereinbefore have been fully set forth. I may quickly heat-treat oil-decolorizing-clay substance such as fullers' earth and the like either before or after reducing the same to the desired particle size. Closer control of the process and product is generally possible when the quick heat-treatment is upon the comminuted fuller's earth; and such procedure is especially preferred when it is desired to prepare end-products that are so hard and water-resisting as to be commercially suitable for the treatment of water and aqueous liquids by reason of being substantially completely dehydrated and having been heated to such a temperature and for such a period of time as almost, if not actually to result in the taking-place of incipient fusion of the particular fuller's-earth substance undergoing treatment.

Hard and water-resisting oil-decolorizing-clay substances can be made from water-disintegrative oil-decolorizing-clay substances by heat-treating the starting substance at increasing temperatures ending above about 900° F., or thereabove, and for such a period of time as will remove all of the free moisture and a substantial portion of the water of composition. Preferably, however, since I have found that thereby the end-products are in all cases harder and more water-resisting than it is possible to obtain, if at all, when the starting substance is heated only to such a temperature and for such a period of time as will remove, at the most, almost, if not quite all, of the water of composition, I rapidly heat-treat the fuller's earth (as hereinbefore set forth) to the point which causes it to be substantially completely dehydrated (all of the free moisture and substantially all of the water of composition are removed) but below the point of substantial fusion of the individual pieces; that is to say, the oil-decolorizing-clay substance of the water-disintegrative type and kind, may, in order to obtain an improved hard and water-resisting substance for the treatment of water and aqueous liquids, be heated, preferably rapidly, to, at, or slightly below or slightly above the point of incipient fusion, which point is appreciably above the point at which the starting oil-decolorizing-clay substance will be substantially completely dehydrated. It is also within the scope of my invention that I may similarly heat-treat oil-decolorizing-clay substances which are not of the water-disintegrative type or kind. Likewise, depending upon the particular use to which the end-product is to be put, for example, when I wish to prepare an exceedingly hard and water-resisting end-product that is suitable for use, for example, as a filler and as a highway and building-construction material (e. g., as an ingredient or constituent of pavements, paints or roofing compositions), I may heat-treat the starting oil-decolorizing-clay substance to the point at which substantial fusion of the same does take place, in which case the end-product is not suitable for use in the treatment of oils (and therefore can not be defined as an oil-decolorizing-clay substance) but has had created in it, by reason of the particular heat treatment to which it has been subjected, other properties that make it valuable for other purposes. The substance may be heat-treated, in one or another of the ways mentioned in this paragraph, at any convenient point in the process and in one or more stages.

Obviously, the various end-products that are obtained by practicing various modifications of my invention have a wide variety of industrial applications; and by the use of such product or products, because of the improved physical and/or chemical characteristics of the same, more effective results are obtained than would be obtained by the use of end-products resulting from the treatment of the same or similar starting substances by processes old in the art. One or another of the products of my invention (the particular product that I prefer to use varying with the particular physical and other characteristics of the particular substance to be treated) may be employed for the treatment of such substances as the following: dry or saturated vapors, gases, oily and aqueous liquids, mixtures of oily and aqueous liquids, gases or vapors containing mechanically entrained oily or aqueous liquids, and the like. I may use, for example, one or another of the products of my invention in the treatment, during the act of smoking, of smoke resulting from the incomplete combustion of tobacco; or, as other examples, for the removal of undesirable constituents from either superheated or saturated steam, or from natural or artificial gas, et cetera; or for the removal of moisture or like undesirable constituents from compressed air, chlorine, air for liquefaction, hydrogen, oxygen, acetylene, carbon dioxide, sulfur dioxide, and the like; as a desiccant; for the treatment of emulsified oils; for the reclamation of waste crankcase oils and dry-cleaning solvents; as a filter aid; for decolorizing and/or otherwise purifying animal and vegetable oils, fats and waxes (e. g., mineral waxes), and petroleum hydrocarbon oils (e g., crude oil, gasoline, kerosene, lubricating oils, petrolatums, waxes; for the treatment of industrial and municipal plant waste waters which, if certain types of impurities often present therein are not removed, contaminate the stream or streams into which they are discharged; as a filler and a constituent of building-construction material (for example, as an ingredient or constituent of pavements, paints, roofing compositions, et cetera). Still other uses for the various products that result from the practicing of my invention in its various modifications will be apparent to those skilled in the art. It is emphasized that I do not limit myself to any particular use or uses for the various end-products that result from putting my invention, and the modifications thereof, into effect, and that I contemplate using the various end-products for any and all commercial purposes for which the same may be especially fitted by reason of the new and novel and improved physical and/or chemical characteristics of the said end-product.

I may use any suitable type of apparatus in the practicing of my invention. I may use kilns, furnaces or other apparatus of suitable design that will effectively and economically serve my purpose.

I may advantageously use apparatus of a general design similar to that now widely utilized in the so-called "spray drying" of various heat-sensitive substances such as eggs, potatoes, yams, strawberries, pineapple juice, bananas, molasses, corn, barley, oats, milk, casein, etc. Equipment of this general type is made and sold by the Bowen Research Corporation, 117 Liberty Street, New York City, N. Y., and also by the Western Precipitation Company of Los Angeles, California. Apparatus sold by the latter company is known to the trade as the "Peebles Spray Drying System." The same general principles and apparatus (with certain modifications) as are used in the spray drying of food stuffs may be utilized in quickly heat-treating oil-decolorizing-clay substances to obtain, in addition to a quick drying (removal of moisture) of the same with well recognized advantages in a saving of time, other advantages and improvements in the useful qualities of the end-products as hereinbefore fully set forth and explained.

When equipment of the type mentioned in the previous paragraph is employed, the time and temperature of heating the oil-decolorizing-clay substance are substantially the same, that is to say, within substantially the same ranges, as hereinbefore set forth. If anything, the period of heating is shorter, when such apparatus is used, in the obtainment of the same general types of end-products, that is, end-products of substantially the same physical and/or chemical characteristics, than when some other type of apparatus or means of quickly heat-treating the oil-decolorizing-clay substance is employed. Although not limited thereto, such a method of quickly heat-treating oil-decolorizing-clay substance is especially applicable to treatment of powdered oil-decolorizing-clay substances or to oil-decolorizing-clay substances in the form of a slime or a slurry (for example, to pulp-form activated bleaching clays, which are especially "sensitive" to excessive heat-treatment; or to water-washed or -classified fuller's earth; or to steam-exploded oil-decolorizing-clay substance; or to similar pulp-form oil-decolorizing-clay substances). The process consists essentially in forcing (as by spraying, atomizing, jetting, by gravity flow, or by any other natural, mechanical or other means) the oil-decolorizing-clay substance into a chamber wherein the oil-decolorizing-clay substance is intimately mixed with the drying or heating medium, and the dried and heat-treated finely divided particles swept immediately into a cooler outer zone in which they are retained until leaving the chamber and going to dust collectors. Quick cooling of the heat-treated substance is, in almost all cases, an essential feature of such processes, and similar quick cooling of the oil-decolorizing-clay substance is likewise preferably done, for reasons that will be set forth hereinafter, in the practicing of my invention.

The so-called "Peebles Spray Drying System," as hereinbefore mentioned, is one form of apparatus that I may use in the practicing of my invention. The important units of this system are a so-called "desiccator" (a cylindrical chamber comparatively small in size), a motor-driven atomizer, a direct-heat furnace (or a direct-fired heat exchanger), and an efficient dust collector. In the desiccating chamber the atomized material is intimately mixed with the drying or heat-treating medium, and the dried and heat-treated finely divided particles are swept immediately into a cooler outer zone in which they are retained until they leave the desiccator and go to the dust collectors. As stated in the paragraph immediately preceding I may force the oil-decolorizing-clay substance into the chamber just mentioned (so-called "desiccator") by any suitable means. The desiccator of the Peebles system has a large evaporating capacity due to the great atomizing capacity of the atomizer, and because of the thorough mixing of the finely atomized feed with suitable volumes of high temperature drying or heat-treating medium. The atomizer of this system is a rotating centrifugal-type unit into which the oil-decolorizing-clay substance to be atomized is fed through a feed pipe at low pressure from a pump (or by any other suitable means, for example, by gravity from an overhead tank). The Peebles atomizer normally runs at a speed of from 10,000 to 15,000 R. P. M., and this high speed and the design of the atomizer insure thorough atomization. The heat for the desiccating or heat-treating operation may be produced in a number of different ways, depending upon local conditions and the nature of the particular oil-decolorizing-clay substance to be heat-treated. An oil or gas furnace may be used for direct heating of the drying or heat-treating gas without the use of a heat exchanger, the products of combustion mixing directly with air to make the drying or heat-treating medium. Oil or gas fuels may be used. Waste stack gases from boiler or furnace operations also may be used as the drying or heat-treating gas, and may be passed directly to the desiccator. Any suitable type of dust collectors may be employed. Multiclone dust collectors are generally to be preferred on account of their high efficiency and because they immediately remove the dried and heat-treated material from the drying or heat-treating gases. The Peebles system is automatically controlled. The temperature of the drying medium is regulated by a thermostat located in the hot gas inlet to the desiccator. This thermostat operates the motor driven fuel control valve, so that the temperature of the drying or heat-treating gases is constant within any predetermined range. The oil-decolorizing-clay substance to be atomized is so controlled that the amount of feed to the atomizer is constant. When the proper operating conditions are determined and these two controls are set, a uniform production is assured. The short period of time during which the oil-decolorizing-clay substance is in contact with the high temperature gases results in the driving off of the water with what may be properly described as an almost explosive effect with resultant improvement in the useful qualities of the end-product that hereinbefore have been fully set forth and described. Quick cooling of the heat-treated oil-decolorizing-clay substance to the temperature of the exhaust gases, or below, results in a still further improvement in the physical characteristics of the end-product, for example, among other changes that take place, it hardens and toughens the individual particles of oil-decolorizing-clay substance so that the end-product will better resist wear when in use.

The Bowen system of so-called "spray drying," which is another form of apparatus that, as hereinbefore mentioned, I may use, with or without modifications therein and thereof, in the practicing of my invention, is disclosed in U. S. Patent Numbers 1,711,306, 1,753,915, 1,692,617, 1,722,175, 1,745,168, and in others.

It is emphasized and pointed out that any suitable type of apparatus wherein and whereby oil-decolorizing-clay substance may be quickly heat-treated for the purposes hereinbefore set forth, and at the temperatures and for the periods of time likewise hereinbefore set forth, may be used in the practicing of my invention. Regardless of the type of apparatus employed, it is likewise emphasized and pointed out that the hot oil-decolorizing-clay substance (hot by reason of the heat-treatment to which it has been subjected) may be, and in many cases preferably is, quickly cooled to the temperature of exhaust gases, or below, for example, to a temperature which may range between 80° and 700° F., for the purpose, among others, of hardening and toughening the heat-treated oil-decolorizing-clay substance. I may use any suitable means of quickly cooling the heat-treated substance and I may perform this quick cooling at any one or more stages in the process. When the starting oil-decolorizing-clay substance is water-resistant, or when it has been made almost or completely water-resistant by reason of the heat-treatment to which it has been subjected, I may quickly cool the heat-treated substance with water or other medium that volatilizes in the presence of or in contact with heat. When it appears advantageous so to do, I may alternately heat-treat and quickly cool a number of times, for example, two, three, or more times, until the end-product has the desired hardness, toughness, and/or other physical and/or chemical properties.

When my invention is practiced for the obtainment of an end-product adapted for decolorizing and otherwise purifying petroleum hydrocarbon oils, that end-product has a lower bulk weight per unit of volume (that is to say, is more porous) and is a more efficient agent, on a weight basis, for decolorizing and otherwise purifying petroleum hydrocarbon oils than is a product obtained by the heat treatment of like starting material at substantially lower temperatures and for substantially longer periods of time than the temperatures and periods of time employed by me in the practicing of my invention and described hereinbefore; that is to say, is a more efficient agent, on a weight basis, for decolorizing and otherwise purifying petroleum hydrocarbon oils than is a product obtained by the heat treatment of like starting material in accordance with processes heretofore old in the art.

The terms "method" and "process" as employed herein have a synonymous meaning. It is also to be understood that an "oil-decolorizing substance" or an "oil-decolorizing siliceous substance" is the equivalent of an "oil-decolorizing-clay substance." In other words, synthetically prepared oil-decolorizing substances or synthetically prepared oil-decolorizing, siliceous substances are deemed by me to be fully within the scope of this invention. The terms "oil-decolorizing clay" and "oil-decolorizing-clay substance", as used by me herein, have a synonymous meaning.

In accordance with the provisions of the patent statutes, I have hereinbefore described the best mode or modes now known to me of carrying this invention into effect; but I desire it to be distinctly understood that I fully realize that changes may be made therein and that I intend to include within the scope of the claims that follow hereinafter all modifications that do not depart substantially from the spirit of the invention set forth therein and thereby.

What I claim is:

1. The method which includes the step of heating oil-decolorizing clay to a temperature of at least 1600° F. for a period of the order of 4 to 5 seconds.

2. The method of treating oil-decolorizing clay which consists in reducing such clay to a finely divided state and heating the finely divided clay to a temperature of at least 1600° F. for a period of the order of 4 to 5 seconds.

3. The method of treating fuller's earth to improve its useful properties which consists in comminuting crude fuller's earth and heating the comminuted fuller's earth to a temperature of at least 1600° F. for a period of the order of 4 to 5 seconds.

4. The method of treating Florida fuller's earth to improve its useful properties which includes the step of heating such earth at a temperature of about 1600° to 1800° F. for a period of the order of 4 to 5 seconds.

5. The method of improving the useful properties of fuller's earth which includes the steps of heating such earth to a temperature of at least 1600° F. for a period of the order of 4 to 5 seconds and quickly cooling the thus heated earth with water.

6. The method of improving the useful properties of Florida fuller's earth which includes the steps of heating such earth to a temperature of the order of 1600° to 1800° F. for a period of the order of 4 to 5 seconds and applying water to the thus heated earth quickly to cool the same.

7. The method of treating fuller's earth to improve its useful properties which consists in comminuting crude fuller's earth, heating the comminuted fuller's earth to a temperature of at least 1600° F. for a period of the order of 4 to 5 seconds and quickly cooling the thus heated earth with water.

HAROLD L. KAUFFMAN.